(12) United States Patent
Daniels et al.

(10) Patent No.: US 11,549,824 B2
(45) Date of Patent: Jan. 10, 2023

(54) APPARATUSES, SYSTEMS, AND METHODS FOR IMPROVED VIBRATION RESISTANCE

(71) Applicant: Honeywell International Inc., Morris Plains, NJ (US)

(72) Inventors: Aaron Daniels, Echo, MI (US); Murgesh R. Sajjan, Bangalore (IN); Charles Licata, Petoskey, MI (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 893 days.

(21) Appl. No.: 16/402,738

(22) Filed: May 3, 2019

(65) Prior Publication Data

US 2020/0348152 A1    Nov. 5, 2020

(51) Int. Cl.
*G01D 5/22* (2006.01)
*G01B 7/00* (2006.01)

(52) U.S. Cl.
CPC ........... *G01D 5/2291* (2013.01); *G01B 7/001* (2013.01)

(58) Field of Classification Search
CPC ......... G01D 5/2291; G01D 5/12; G01B 7/001
See application file for complete search history.

(56) References Cited

U.S. PATENT DOCUMENTS

| | | | | |
|---|---|---|---|---|
| 10,782,156 B2 * | 9/2020 | Daniels | ................... | G01D 18/00 |
| 10,996,078 B2 * | 5/2021 | Daniels | ................... | H01F 21/06 |
| 11,047,711 B2 * | 6/2021 | Ravikumar | .......... | G01D 5/2291 |
| 2006/0115343 A1 | 6/2006 | Hartney et al. | | |
| 2016/0033306 A1 * | 2/2016 | Hubbell | ............... | G01D 5/2291 244/76 R |
| 2018/0143038 A1 | 5/2018 | Daniels et al. | | |
| 2018/0252553 A1 | 9/2018 | Daniels et al. | | |
| 2019/0186956 A1 * | 6/2019 | Daniels | ................... | G01D 18/00 |

FOREIGN PATENT DOCUMENTS

| | | | | |
|---|---|---|---|---|
| CN | 203615885 U | 5/2014 | | |
| CN | 106643450 A | 5/2017 | | |
| CN | 207163424 U | 3/2018 | | |
| EP | 3471114 A1 | 4/2019 | | |
| EP | 3674670 A1 * | 7/2020 | ............. | G01D 11/24 |
| EP | 3726185 A1 * | 10/2020 | ............. | G01D 5/204 |

(Continued)

OTHER PUBLICATIONS

Extended European Search Report to Patent Application No. 20171673.5 dated Sep. 15, 2020, 7 pages.

(Continued)

*Primary Examiner* — Nimeshkumar D Patel
*Assistant Examiner* — Tania Courson
(74) *Attorney, Agent, or Firm* — Alston & Bird LLP

(57) ABSTRACT

Apparatuses, systems, and associated methods of assembly are described that provide for improved probed assemblies for use in sensors configured to convert between motion and electrical signals. An example probe assembly includes a probe rod defining a first end. In an operational configuration, the probe rod is at least partially received by a sensor device. The probe assembly further includes a probe head that receives the first end of the probe rod. The probe head mates with the first end so as to secure the probe rod therein. The first end of the probe rod is further welded to the probe head via a butt welding technique.

17 Claims, 6 Drawing Sheets

(56) References Cited

FOREIGN PATENT DOCUMENTS

| EP | 3734230 A1 | * | 11/2020 | ............. G01B 7/001 |
| JP | 9189570 A | | 7/1997 | |
| JP | 2010-019682 A | | 1/2010 | |
| WO | 2013/112181 A1 | | 8/2013 | |

OTHER PUBLICATIONS

First Office Action issued in Chinese Application No. 202010364824.2 dated Sep. 29, 2021, 13 pages.
Office Action received for EP Application No. 20171673.5, dated Oct. 27, 2021, 5 pages.
CN Office Action dated Mar. 24, 2022 for CN Application No. 202010364824.
English Translation of CN Office Action dated Mar. 24, 2022 for CN Application No. 202010364824.
CN Office Action dated Aug. 1, 2022 for CN Application No. 202010364824.
English Translation of CN Office Action dated Aug. 1, 2022 for CN Application No. 202010364824.

* cited by examiner

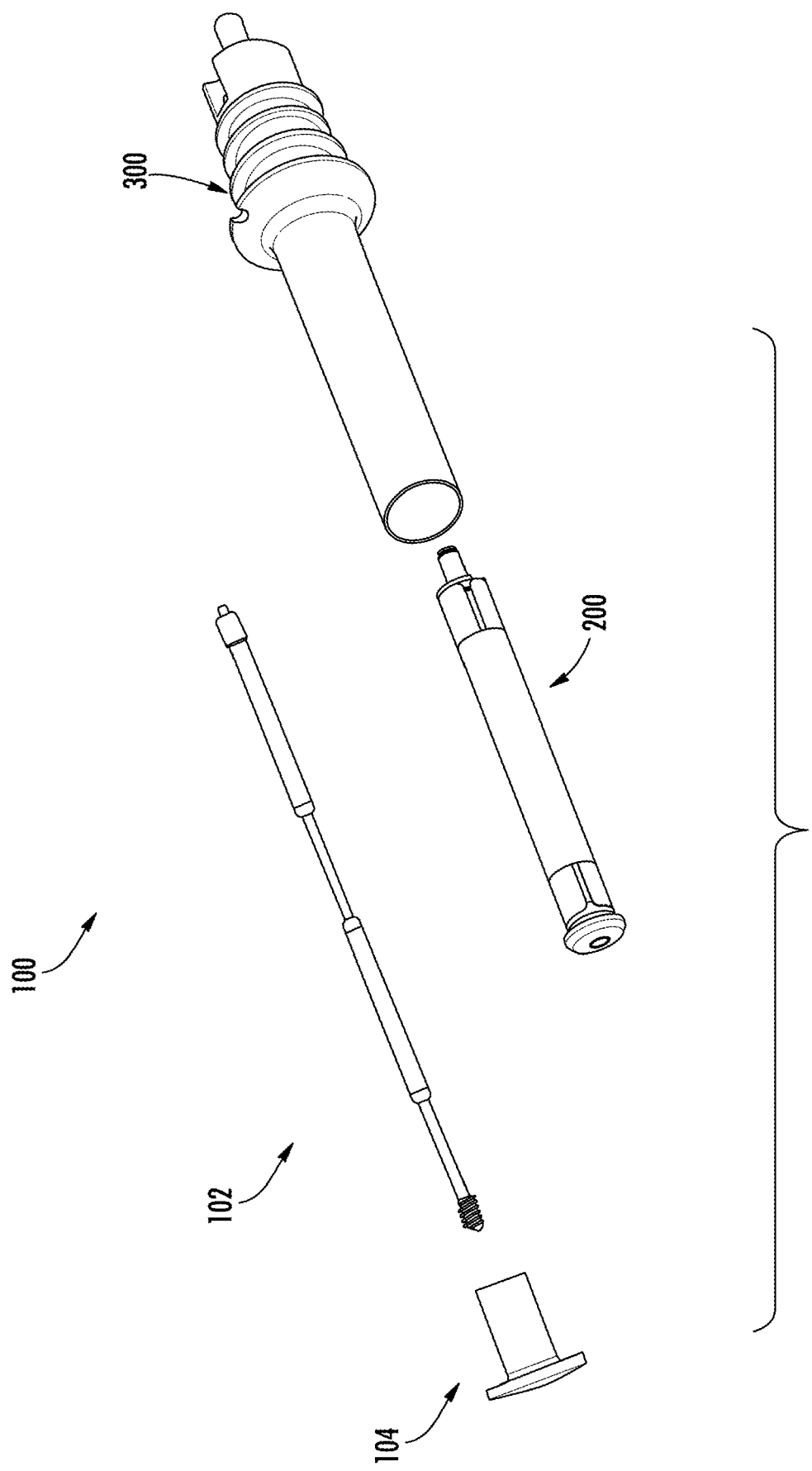

APPARATUSES, SYSTEMS, AND METHODS FOR IMPROVED VIBRATION RESISTANCE

TECHNOLOGICAL FIELD

Example embodiments of the present invention relate generally to sensor devices and, more particularly, to improving the operation of sensor devices subjected to vibrational loads.

BACKGROUND

Sensor assemblies, such as a Linear Variable Differential Transformer (LVDT), may be used to convert between mechanical motion (e.g., vibration, strain, force, linear motion, etc.) and electrical signals (e.g., current, voltage, etc.). These sensors may be used in hydraulic applications, engine systems, automated teller machines (ATMs), aerospace applications, and a variety of other environments in which conversion between mechanical motion and electrical signals is needed. In these applications, such as in an engine control system, the sensor system may be exposed to strain, vibrational loads, or other forces that may damage the sensor system.

BRIEF SUMMARY

Systems, apparatuses, and methods are disclosed herein for providing improved sensor devices. In one embodiment, an example probe assembly for use in sensors configured to convert between motion and electrical signals is provided. The probe assembly may include a probe rod defining a first end. The probe rod may be configured to, in an operational configuration, be at least partially received by a sensor device. The probe rod may further include a probe head configured to receive the first end of the probe rod. The probe head may be configured to mate with the first end so as to secure the probe rod therein. The first end of the probe rod may be further welded to the probe head.

In some embodiments, the first end of the probe rod may further define a first threaded element and the probe head may further define a second threaded element. As such, connection between the first threaded element and the second threaded element may be configured to secure the probe rod within the probe head.

In some cases, the probe head may define an opening configured to at least partially receive the probe rod therein. In this way, the first end of the probe rod is substantially aligned with an exterior surface of the probe head to accommodate a butt weld between the probe rod and the probe head.

In some other embodiments, the first end of the probe rod is welded to the probe head via a butt weld. In such an embodiment, the butt weld may be configured such that the first end of the probe rod is substantially aligned (e.g., flush, square, level, smooth, coplanar, or the like) with an exterior surface of the probe head.

In some embodiments, the probe rod may further define a second end opposite the first end, and the second end may define a third threaded element.

In any embodiment, the probe rod may further define one or more spacers disposed at least partially around the probe rod. In other embodiments, the probe rod of the present disclosure may be configured such that spacers are unnecessary.

In another embodiment, a sensor device for converting between motion and electrical signals is provided. The sensor device may include a bobbin tube that defines a hollow interior and a probe assembly received by the bobbin tube. The probe assembly may include a probe rod defining a first end, and a probe head configured to receive the first end of the probe rod. The probe head may be configured to mate with the first end so as to secure the probe rod therein. The first end of the probe rod may further be welded to the probe head. The sensor device may further include one or more coil elements wound around the bobbin tube. The one or more coil elements may be configured to magnetically interact with the probe assembly.

In another embodiment, a method of manufacturing a probe assembly is provided. The method may include the step of providing a probe rod defining a first end. The probe rod may be configured to, in an operational configuration, be at least partially received by a sensor device. The method may also include the step of providing a probe head that may be configured to receive the first end of the probe rod. The method may further include the step of mating the probe head with the first end so as to secure the probe rod within the probe head. The method may also include the step of welding the probe rod to the probe head. In some instances, the welding may include forming a butt weld between the probe rod and the probe head.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

FIG. 2 is an exploded view of the sensor assembly of FIG. 1 according to an example embodiment;

DETAILED DESCRIPTION

Overview

Figure 1A:
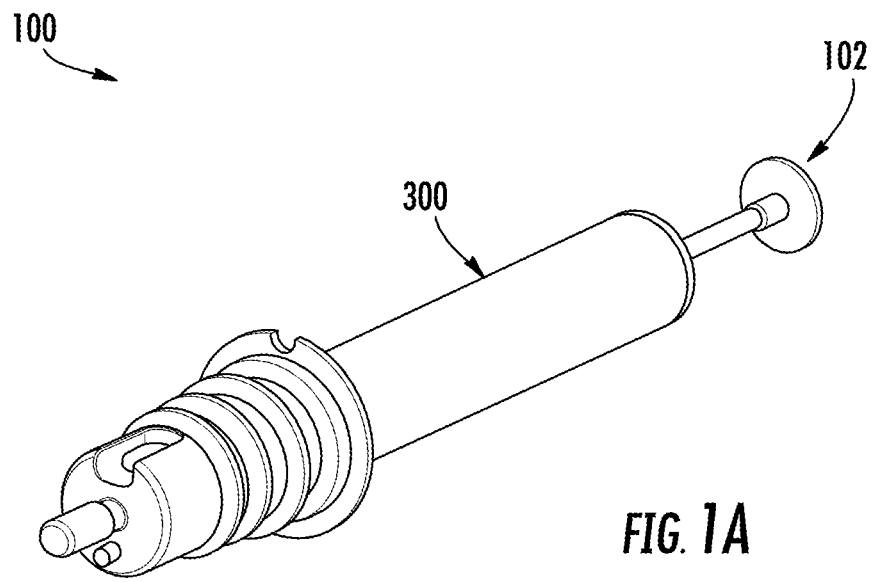
FIGS. 1A-1B are perspective views of an assembled sensor assembly that includes a probe assembly for use with some embodiments described herein.

The present invention now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout. As used herein, terms such as "front," "rear," "top," etc. are used for explanatory purposes in the examples provided below to describe the relative position of certain components or portions of components. Furthermore, as would be evident to one of ordinary skill in the art in light of the present disclosure, the terms "substantially" and "approximately" indicate that the referenced element or associated description is accurate to within applicable engineering tolerances.

The sensor assembly and sensor device described and illustrated herein may refer to a LVDT system as an example application. As would be evident to one of ordinary skill in the art in light of the present disclosure, the apparatuses, systems, and methods described herein regarding probe assemblies that provide improved resistance to vibrational loads may be equally applicable to sensor systems of all types, configurations, sizes, and the like. Said differently, the description herein should not be read as to only relate to LVDT applications. Furthermore, example probe assemblies of the present disclosure may refer to an operational configuration. As would be evident to one of ordinary skill in the art in light of the present disclosure, the operational configuration may refer to an instance in which example probe assemblies are received by sensor devices.

Traditional sensor devices and probe assemblies fail to adequately support or secure device components from high vibrational loads. In particular, conventional devices rely upon fillet welds between a probe assembly and bobbin tube as well as between the bobbin tube and other portions of the sensor device. These conventional fillet weld techniques fail to provide the necessary resistance to withstand high vibrational load environments. Furthermore, the location of these fillet welds are subjected to increased vibrational loads. Conventional attempts at improving sensor devices often focus on reducing misalignment between elements as opposed to designing sensor devices that are configured to withstand and operate in high vibrational environments. Said differently, these traditional devices may attempt to increase rigidity of the sensor device to prevent misalignment, but fail to adequately modify these sensor devices to operate when experiencing high vibrational loads. Furthermore, conventional connection methods that rely on fillet welds require the removal of additional material (e.g., via the fillet welding process) resulting in the need for large, bulky probe rods (e.g., that provide the necessary excess material) and, as a result, increasing the size of the assembled sensor devices. Still further, conventional attempts at improving sensor devices may rely on expensive high strength materials and/or include additional components in order to sustain high vibrational loads thereby increasing the cost and size associated with the sensor device.

Figure 1B:
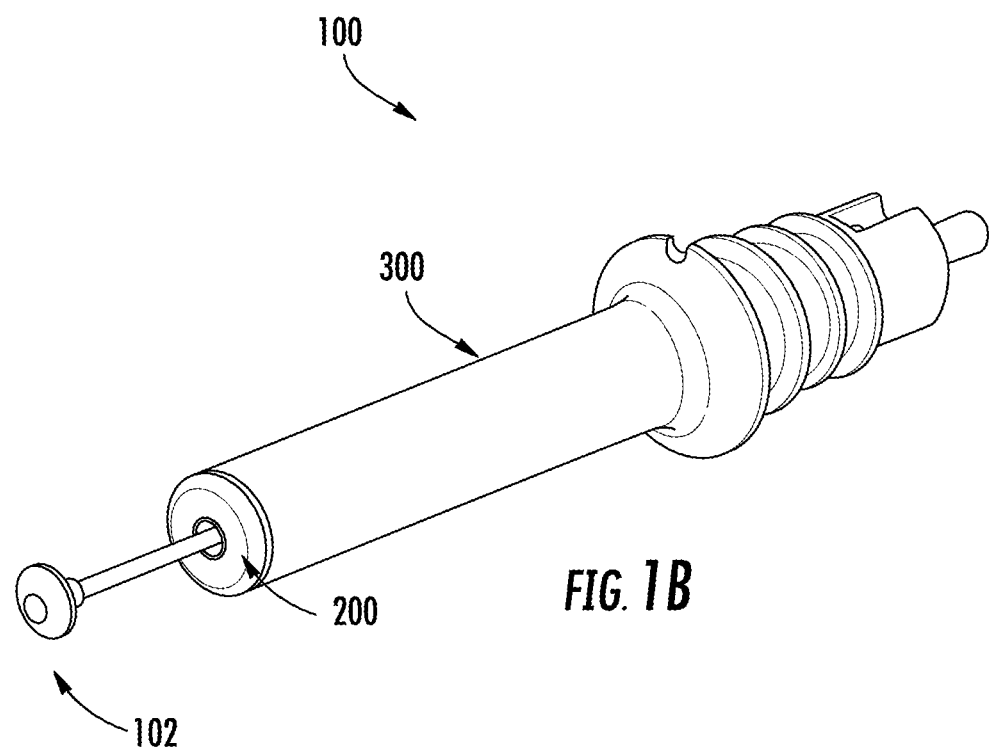
Figure 3:
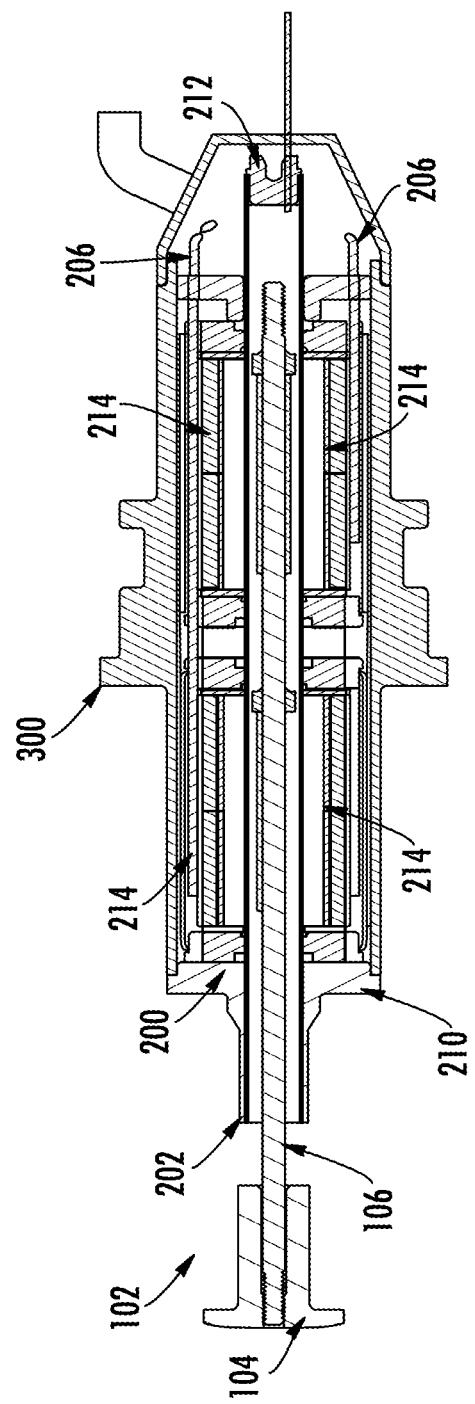
FIG. 3 is a cross-sectional side view of the assembled sensor assembly of FIG. 1 according to an example embodiment.

With reference to FIGS. 1A-1B, perspective views of an assembled sensor assembly 100 of the present disclosure are illustrated. As shown, the sensor assembly 100 may include a housing 300, a probe assembly 102, and a sensor device 200. The probe assembly 102, described hereafter with reference to FIGS. 6A-6B, may be received by the sensor device 200 and supported within a bobbin tube (e.g., bobbin tube 202 in FIGS. 3-5B) of the sensor device 200. The sensor assembly 100 may further include a housing 300 configured to shield or otherwise protect the sensor device 200 and probe assembly 102 received therein. As described above, the sensor device 200 of the present application may be received within aerospace applications, engine compartments, and the like such that preventing damage to the sensor device 200 is necessary in order to ensure accurate operation (e.g., positional and directional data in an LVDT application) of the sensor device 200. As such, the housing 300 of the present application may be dimensioned (e.g., sized and shaped) and formed of any material so as to impart the necessary protection for the intended application of the sensor device 200. With reference to FIGS. 2-3, an exploded view and a cross-sectional side view, respectively, of the example sensor assembly 100 of FIG. 1 are illustrated. As shown, the probe assembly 102 may be received by (inserted within) the sensor device 200 (e.g., device 200), and the combined probe assembly 102 and the device 200 may be received by the housing 300 (e.g., inserted together within the housing 300). Relevant elements of the sensor device 200 are described hereafter with reference to FIG. 4.

Figure 4:
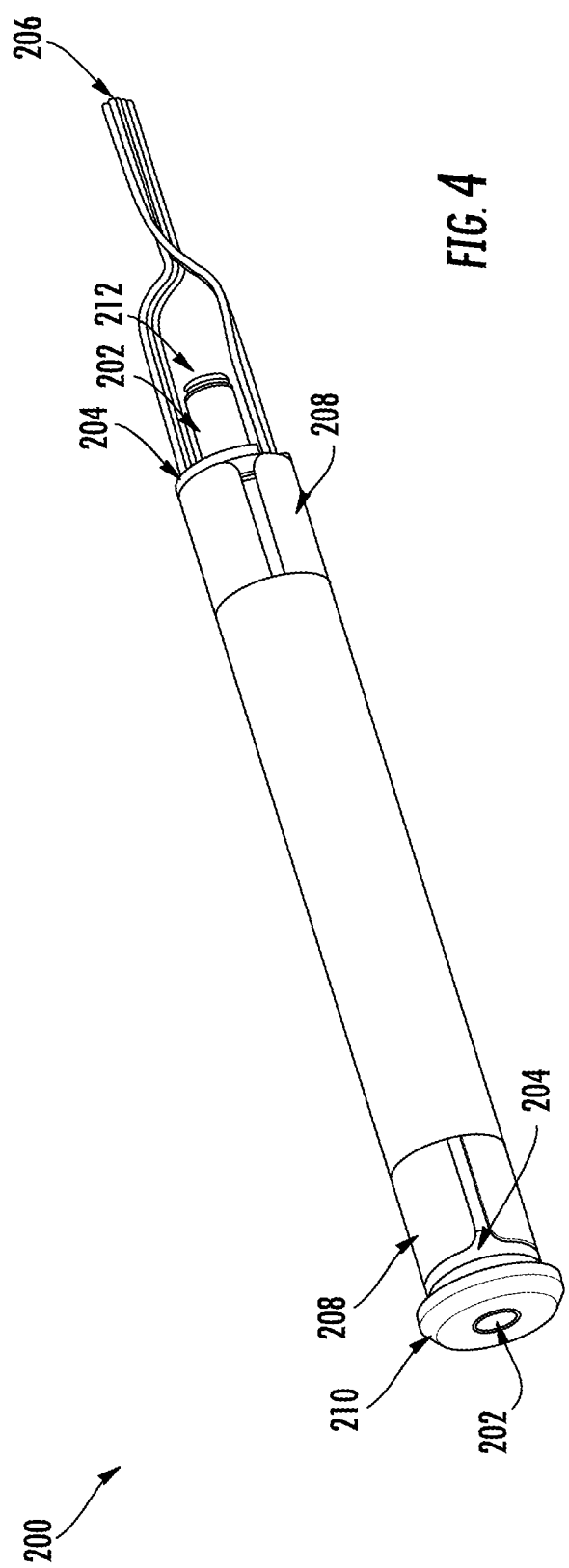
FIG. 4 is a perspective view of a sensor device of FIG. 1 according to an example embodiment.

With reference to FIG. 4, an example sensor device 200 (e.g., device 200) is illustrated. The device 200 may include a bobbin tube 202, one or more washers 204, a wire harness 206, and a return shield element 208. As shown in FIG. 3, the bobbin tube 202 may be defined as a hollow cylindrical element that includes a hollow interior. As described and shown above with reference to FIG. 1, the hollow interior of the bobbin tube 202 may be configured to receive a probe assembly (e.g., probe assembly 102) inserted therein. As would be evident to one of ordinary skill in the art in light of the present disclosure, the device 200 may be configured such that when the probe assembly is inserted therein, the probe is suspended within the bobbin tube 202. Said differently, the probe assembly may be secured (e.g., at a first end described hereafter) such that the portion of the probe assembly within the bobbin tube 202 does not contact the inside of the bobbin tube 202. While illustrated and described herein with reference to a cylindrical bobbin tube 202, the present disclosure contemplates that the bobbin tube 202 may be dimensioned (e.g., sized and shaped) for use with sensor assemblies of any size, shape, or configuration.

With continued reference to FIG. 3, the device 200 may include one or more washers 204 that are attached around the bobbin tube 202. The device 200 may include two (2) washers 204 that are located collinearly along a length of the bobbin tube 202. As would be evident to one of ordinary skill in the art, in some instances, the washers 204 may each be formed as single members such that each washer 204 is attached at an end of the bobbin tube 202 and translated along the length of the bobbin tube 202. In other embodiments, the washers 204 may be formed as modular components such that washers 204 may be snapped or otherwise attached to the bobbin tube 202 at any location along the length of the bobbin tube 202. While illustrated and described herein with reference to two (2) washers 204, the present disclosure contemplates that any number of washers 204 may be attached to the bobbin tube 202 at any location along the length of the bobbin tube 202.

As shown in FIG. 3, the device 200 may further include one or more coil elements 214 (e.g., a primary coil, a secondary coil, tertiary coils, etc.) that are wrapped around at least a portion of the bobbin tube 202. As would be evident to one of ordinary skill in the art, the one or more coil elements 214 may be formed of a magnetic material so as to identify differential voltage readings caused by a movement of the probe assembly (e.g., probe assembly 102) within the bobbin tube 202. As shown in FIG. 3, the coil elements 214 may surround at least a portion of the length the bobbin tube 202 and may, in some embodiments, span a length of the bobbin tube 202 between the washers 204. Furthermore, the device 200 may include one or more insulating tape layers (not shown) that are wrapped around one or more of the coil elements 214 and the return shield element 208. As would be evident to one of ordinary skill in the art in light of the present disclosure, the insulating tape layers (not shown) may operate to shield magnetic flux (e.g., insulate) the coil elements 214 as well as between other elements of the sensor device 200.

With continued reference to FIGS. 2-3, the device 200 may include a wire harness 206 that includes one or more wires (e.g., lead wires). The one or more wires of the wire harness 206 may be positioned via one or more notches of the one or more washers. The wires of the wire harness 206 are configured to be, when attached in the device 200, communicably coupled with the probe assembly (e.g., probe assembly 102) inserted in the bobbin tube 202. As would be evident to one of ordinary skill in the art, the wires of the wire harness 206 may be used to provide power to the probe assembly inserted in the bobbin tube 202 as well as to transmit signals (e.g., output delivery signals) generated in response to movement of the probe assembly. The device 200 may further include a return shield element 208 that is disposed around the wires of the wire harness 206 and may be configured to compress the one or more wires of the wire harness 206 between the one or more washers 204 and the return shield element 208 so as secure the wire harness 206 to the device 200.

Figure 5A:
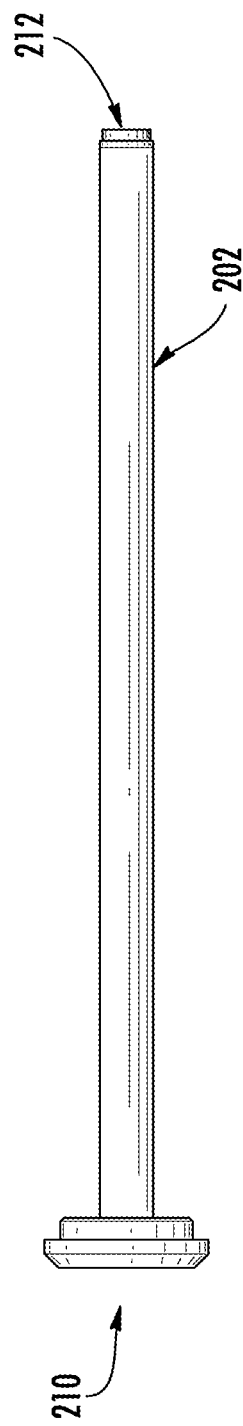
FIGS. 5A-5B are side views of a bobbin tube, front fitting, and bobbin plug according to an example embodiment.
Figure 5B:
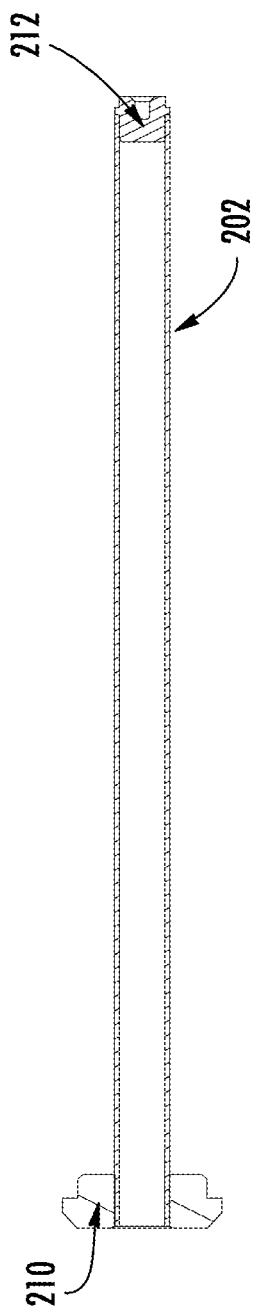

With reference to FIGS. 5A-5B, side views of a bobbin tube 202 of the device 200 are illustrated. As shown, the bobbin tube 202 may be defined as a hollow cylindrical element that includes a hollow interior. As described and shown above with reference to FIGS. 1-4, the hollow interior of the bobbin tube 202 may be configured to receive a probe assembly (e.g., probe assembly 102) inserted therein. As would be evident to one of ordinary skill in the art in light of the present disclosure, the device 200 may be configured such that when the probe assembly is inserted therein, the probe is suspended within the bobbin tube 202. Said differently, the probe assembly may be secured (e.g., at a first end described hereafter) such that the portion of the probe assembly within the bobbin tube 202 does not contact the inside of the bobbin tube 202. While illustrated and described herein with reference to a cylindrical bobbin tube 202, the present disclosure contemplates that the bobbin tube 202 may be dimensioned (e.g., sized and shaped) for use with probe assemblies of any size, shape, or configuration.

Figure 6A:
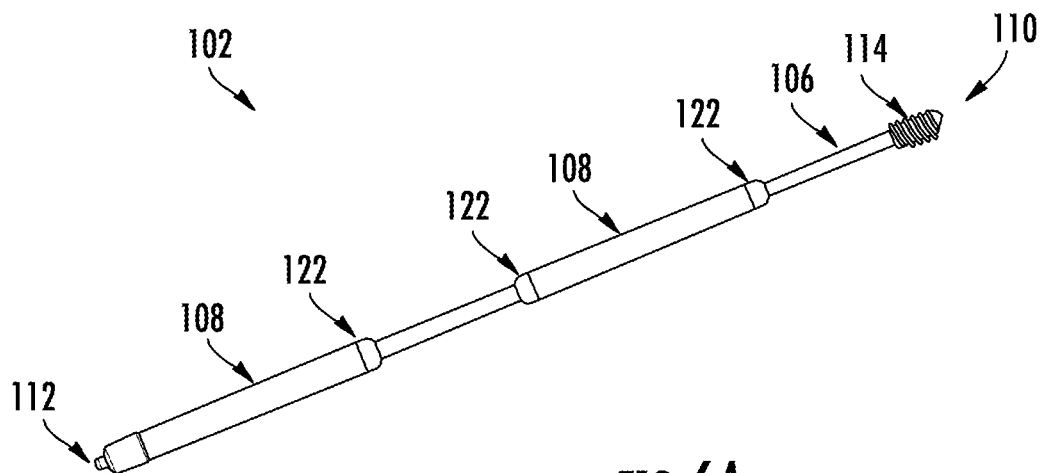
FIGS. 6A-6B are perspective views of an example probe assembly according to an example embodiment.
Figure 6B:
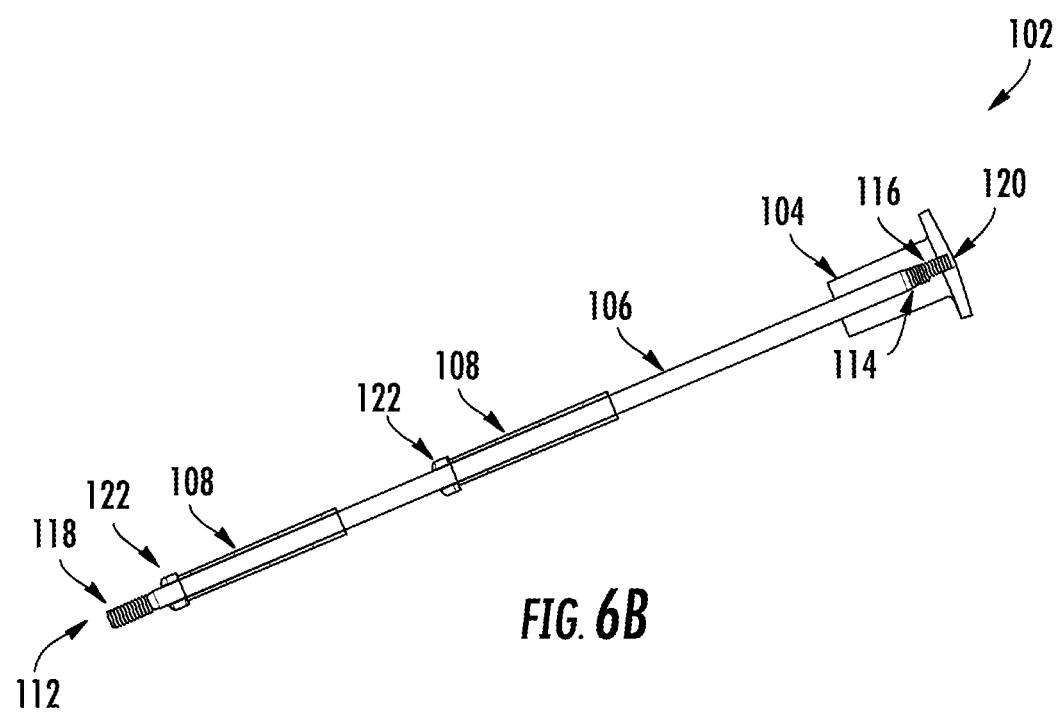

With continued reference to FIGS. 5A-5B, the device 200 may, in some embodiments, include a front fitting 210 and a bobbin plug 212. As shown, the front fitting 210 may be disposed on a first end of the bobbin tube 202 and may be configured to abut a portion of the probe assembly (e.g., probe assembly 102) inserted within the bobbin tube 202. As shown in FIGS. 6A-6B described hereafter, a portion of the probe assembly (e.g., probe head 104) may abut the front fitting 210 and facilitate suspension of the probe assembly in the bobbin tube 202 as described above. The bobbin plug 212 may be disposed on a second end of the bobbin tube 202 opposite the first end, and the bobbin plug may be configured to seal the second end of the bobbin tube 202.

With reference to FIGS. 6A-6B, perspective views of an example probe assembly 102 are illustrated. As shown, the probe assembly may include a probe fitting 104, a probe rod 106, and magnetic slug(s) 108 (e.g., magnetic cores) configured to magnetically interact with the coil elements 214 of the sensor device 200. As would be evident to one of ordinary skill in the art in light of the present disclosure, movement of the position of the magnetic slug(s) 108 within the bobbin tube 202 may be determined via the differential voltage readings between the one or more coil elements 214 and transmitted via a wire harness 206 communicably coupled thereto. By way of example, magnetic interaction between the probe assembly 102 and a primary coil element (not shown) may be configured to induce a signal in a secondary coil element (not shown). This signal in the secondary coil element (not shown) may indicate a relative movement of the probe assembly 102 within the bobbin tube 202. Said differently, the electrical signal of the secondary coil element (not shown) may include a phase that may correspond to a direction of the movement of the probe assembly 102 (e.g., movement direction of the magnetic slug(s) 108) and an amplitude that may correspond to a distance of movement of the probe assembly 102.

With reference to FIG. 6A, the probe assembly 102 may further include a probe rod 106 that defines a first end 110. As shown, the first end 110 may be received by a probe head 104 illustrated in FIG. 6B. The probe head 104 may be configured to receive the first end 110 of the probe rod 106 and may be configured such that the probe head 104 mates with (e.g., engages) the probe rod 106 so as to secure the probe rod 106 within the probe head 104. In some instances, the first end 110 of the probe rod 106 may define a first threaded element 114, and the probe head 104 may further define a second threaded element 116 such that connection between the first threaded element 114 and the second threaded element 116 is configured to secure the probe rod 106 within the probe head 104. While described herein with reference to a threaded connection, the probe assembly 102 of the present application contemplates that connection between the first end 110 of the probe rod 106 and the probe head 104 may be accomplished via other any other engagement mechanism or technique.

Unlike conventional devices, however, the probe assembly 102 utilizes welding between the first end 110 of the probe rod 106 and the probe head 104 in order to strengthen the probe assembly 102 from failure when subjected to vibrational loads. In some embodiments, the first end 110 of the probe rod 106 is welded to the probe head 104 via a butt weld. As shown, in such an embodiment, the probe head 104 may include an opening 120 such that when the probe rod 106 is received within the probe head 104, the first end 110 of the probe rod is substantially aligned with an exterior surface of the probe head 104. In this way, welding of these components may be accomplished via a butt weld in which the probe rod 106 (e.g., the first end 110) and the probe head 104 are joined in the same plane. Said differently, the probe assembly 102 of the present disclosure may be initially assembled by attaching the first end 110 of the probe rod 106 and the probe head 104 (e.g., via a first threaded connection 114 and a second threaded connection 116) such that the first end 110 of the probe rod 106 is secured within the probe head 104 (e.g., at the opening 120). The first end 110 may be positioned within the opening 120 of the probe head 104 such that the first end 110 is substantially aligned with an exterior surface of the probe head 104 (e.g., as shown in FIG. 3). A butt welding technique may subsequently be used to attach the first end 110 of the probe rod 106 to the probe head 104.

In this way, the probe assembly 102 of the present application addresses the technical deficiencies and challenges associated with traditional sensor devices and probe assemblies. As described above, conventional devices rely upon fillet welds between the probe assembly and the bobbin tube as well as between the bobbin tube and other portions of the sensor device. These conventional fillet weld techniques fail to provide the necessary resistance to withstand high vibrational load environments. Furthermore, the location of these fillet welds are subjected to increased vibrational loads as compared to the threaded rod to probe head connections described above. Additionally, the use of butt welds at this threaded connection (e.g., distanced from traditional fillet weld locations) further support the probe assembly 102 of the present disclosure's resistance to vibrational loads. The use of the butt welding techniques and probe assembly configuration 102 described herein provide additional benefits by reducing the amount of material needed to provide a probe rod 106 and, as such, may further result in a smaller form factor (e.g., overall size) for the sensor device 102. Said differently, the use of fillet welds in conventional sensors require the removal of additional material (e.g., via the fillet welding process) such that larger probe rods (e.g., with the necessary excess material) are required.

In some embodiments, the probe rod 106 may further define a second end 112 opposite the first end 110. In such an embodiment, the second end 112 may define a third threaded element 118. In this way, the probe assembly 102 of the present disclosure may be assembled with either the first end 110 or the second end 112 mating with the probe head 104 (e.g., the third threaded element 118 engaging the second threaded element 116). In some further embodiments, the probe rod 106 may define one or more spacers 122 disposed at least partially around the probe rod 106. As described above, the bobbin tube 202 and the probe assembly 102 may be configured such that when the probe assembly 102 is inserted therein, the probe assembly 102 is suspended within the bobbin tube 202. Said differently, the probe assembly 102 may be secured at the first end 110 such that the portion of the probe assembly 102 within the bobbin tube 202 does not contact the inside of the bobbin tube 202. To facilitate this prevention of contact between the probe rod 106/magnetic slugs 108 and the bobbin tube 202, one or more spacers 122 may be positioned along the length of the probe rod 106. In other embodiments, the probe rod 106 of the present disclosure may be configured such that spacers (e.g., spacers 122) are unnecessary.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A probe assembly for use in sensors configured to convert between motion and electrical signals, the probe assembly comprising:
    a probe rod defining a first end, wherein the probe rod is configured to, in an operational configuration, be at least partially received by a sensor device; and
    a probe head configured to receive the first end of the probe rod, wherein the probe head is configured to mate with the first end so as to secure the probe rod therein, wherein the first end of the probe rod is welded to the probe head via a butt weld in which the first end and the probe head are joined in the same plane.

2. The probe assembly according to claim 1, wherein the first end of the probe rod further defines a first threaded element and the probe head further defines a second threaded element such that connection between the first threaded element and the second threaded element is configured to secure the probe rod within the probe head.

3. The probe assembly according to claim 1, wherein the probe head defines an opening configured to at least partially receive the probe rod therein such that the first end of the probe rod is substantially aligned with an exterior surface of the probe head.

4. The probe assembly according to claim 1, wherein the first end of the probe rod is substantially aligned with an exterior surface of the probe head.

5. The probe assembly according to claim 1, wherein the probe rod further defines a second end opposite the first end, wherein the second end defines a third threaded element.

6. The probe assembly according to claim 1, wherein the probe rod further defines one or more spacers disposed at least partially around the probe rod.

7. A sensor device for converting between motion and electrical signals, the sensor device comprising:
    a bobbin tube, wherein the bobbin tube defines a hollow interior;
    a probe assembly received by the bobbin tube, the probe assembly defining:
        a probe rod defining a first end; and
        a probe head configured to receive the first end of the probe rod, wherein the probe head is configured to mate with the first end so as to secure the probe rod therein, and wherein the first end of the probe rod is welded to the probe head via a butt weld in which the first end and the probe head are joined in the same plane; and
    one or more coil elements wound around the bobbin tube, wherein the one or more coil elements are configured to magnetically interact with the probe assembly.

8. The sensor device according to claim 7, wherein the first end of the probe rod further defines a first threaded element and the probe head further defines a second threaded element such that connection between the first threaded element and the second threaded element is configured to secure the probe rod within the probe head.

9. The sensor device according to claim 7, wherein the probe head defines an opening configured to at least partially receive the probe rod therein such that the first end of the probe rod is substantially aligned with an exterior surface of the probe head.

10. The sensor device according to claim 7, wherein the first end of the probe rod is substantially aligned with an exterior surface of the probe head.

11. The sensor device according to claim 7, wherein the probe rod further defines a second end opposite the first end, wherein the second end defines a third threaded element.

12. The sensor device according to claim 7, wherein the probe rod further defines one or more spacers disposed at least partially around the probe rod.

13. A method of manufacturing a probe assembly, the method comprising:
    providing a probe rod defining a first end, wherein the probe rod is configured to, in an operational configuration, be at least partially received by a sensor device;
    providing a probe head configured to receive the first end of the probe rod;
    mating the probe head with the first end so as to secure the probe rod within the probe head; and welding the probe rod to the probe head wherein the first end of the probe rod is welded to the probe head via a butt weld in which the first end and the probe head are joined in the same plane.

14. The method according to claim 13, wherein the first end of the probe rod further defines a first threaded element and the probe head further defines a second threaded element such that mating the probe head with the first end further comprises connecting the first threaded element and the second threaded element.

15. The method according to claim 13, wherein the probe head defines an opening configured to at least partially receive the probe rod therein such that the first end of the probe rod is substantially aligned with an exterior surface of the probe head.

16. The method according to claim 13, wherein the first end of the probe rod is substantially aligned with an exterior surface of the probe head.

17. The method according to claim 13, wherein the probe rod further defines a second end opposite the first end, wherein the second end defines a third threaded element.

\* \* \* \* \*